United States Patent
Shiono et al.

[11] Patent Number: 5,525,660
[45] Date of Patent: Jun. 11, 1996

[54] ORGANOPOLYSILOXANE COMPOSITIONS AND RUBBER ARTICLES

[75] Inventors: Mikio Shiono; Kazumi Okada, both of Gunma-ken, Japan

[73] Assignee: Shin-Etsu Chemical Co., Ltd., Tokyo, Japan

[21] Appl. No.: 354,064

[22] Filed: Dec. 6, 1994

[30] Foreign Application Priority Data

Dec. 7, 1993 [JP] Japan ................................. 5-340045

[51] Int. Cl.$^6$ ................................................ C08K 5/54
[52] U.S. Cl. ................ 524/268; 524/269; 524/434; 524/437; 524/588; 524/731; 524/779; 524/786; 524/863; 524/864
[58] Field of Search ............................ 524/268, 731, 524/860, 863, 864, 269, 588, 437, 434, 779, 786

[56] References Cited

U.S. PATENT DOCUMENTS 4,559,387 12/1985 Endo et al. ............................ 525/102
5,232,982 8/1993 Lucas ........................................ 524/731

FOREIGN PATENT DOCUMENTS 5093135 4/1993 Japan .
6128553 5/1994 Japan .

Primary Examiner—Ralph H. Dean
Attorney, Agent, or Firm—Millen, White, Zelano & Branigan

[57] ABSTRACT

An organopolysiloxane composition contains (A) a both end hydroxyl-blocked diorganopolysiloxane, (B) an inert diorganopolysiloxane, (C) a silane or siloxane having at least three hydrolyzable functional groups, (D) an organosilane having at least two alkoxy groups each attached to a silicon atom and one mercapto group separated from a silicon atom by an alkylene group or a partial hydrolyzate thereof, (E) an organosilane having at least two alkoxy groups each attached to a silicon atom and one amino group separated from a silicon atom by an alkylene group or a partial hydrolyzate thereof, (F) a condensation catalyst, and (G) a fine powder, typically of polycarbonate, having a mean particle size of 0.1–50 μm. The composition is useful as a surface treating agent for cured rubber moldings for imparting non-tackiness, water repellency and lubricity to the rubber surface and forming a long-lasting abrasion resistant coating.

18 Claims, No Drawings

ORGANOPOLYSILOXANE COMPOSITIONS AND RUBBER ARTICLES

BACKGROUND OF THE INVENTION

1. Field of the Invention

This invention relates to an organo-polysiloxane composition which is useful as a surface treating agent for various cured rubber moldings for imparting non-tacky, water repellent, and lubricating properties to the rubber surface and forming an abrasion resistant coating. It also relates to a rubber article having such a coating.

2. Prior Art

Inert silicone oil and various curable organopolysiloxane compositions have been used for imparting non-tackiness and water repellency to rubber surfaces.

The inert silicone oil has high initial wear properties, but does not last long since it is readily shed from the substrate surface by physical action as weak as water washing.

The curable organopolysiloxane compositions used heretofore are typically those containing a both end hydroxyl-blocked diorganopolysiloxane, a Si—H group-containing organopolysiloxane and/or an organoalkoxysilane, and an organic tin compound. These compositions form on the substrate surface coatings which are acceptably tack-free and water repellent, but poor in lubricity and wear resistance. It is possible to improve adhesiveness with a substrate and lubricity, which lead to wear resistance, by adding a mixture or reaction product of an organopolysiloxane having an epoxy group such as glycidoxy group and epoxycyclohexyl group and alkoxysilane or siloxane having an amino group (Japan Kokoku Nos. 54-43023, 56-19813 and 56-47864), but the improvement is not yet fully attained. It is also possible to improve lubricity and wear resistance by adding inert silicone oil to such organopolysiloxane compositions containing a both end hydroxyl-blocked diorganopolysiloxane, a Si—H group-containing organopolysiloxane and/or an organoalkoxysilane, and an organic tin compound (Japan Kokoku No. 4-80072), but the coatings are not satisfactorily durably wear resistant where frictional forces are repeatedly applied. There is a strong desire for improving coatings to be durably wear resistant.

SUMMARY OF THE INVENTION

An object of the present invention is to provide an organopolysiloxane composition which can form on a rubber surface a tack-free, water repellent, lubricating, abrasion resistant coating which lasts long. Another object of the present invention is to provide a rubber article having a coating of the composition.

According to the present invention, there is provided an organopolysiloxane composition comprising (A) a diorganopolysiloxane of the following general formula (1):

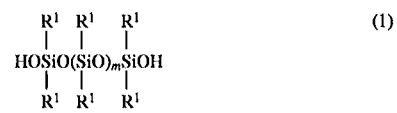

wherein $R^1$ is a substituted or unsubstituted monovalent hydrocarbon group and m is a number of 150 to 10,000, (B) a diorganopolysiloxane of the following general formula (2):

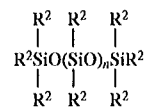

wherein $R^2$ is a substituted or unsubstituted monovalent hydrocarbon group and n is a number equal to or larger than m, (C) a silane and/or a siloxane each having at least three hydrolyzable functional groups in a molecule, (D) an organosilane having at least two alkoxy groups each attached to a silicon atom and one mercapto group separated from a silicon atom by an alkylene group in a molecule and/or a partial hydrolyzate thereof, (E) an organosilane having at least two alkoxy groups each attached to a silicon atom and one substituted or unsubstituted amino group separated from a silicon atom by an alkylene group in a molecule and/or a partial hydrolyzate thereof, (F) a condensation catalyst, and (G) a microparticulate powder, typically of a polycarbonate resin, having a mean particle size of up to 50 μm.

The organopolysiloxane composition of the invention contains a both end hydroxyl-blocked diorganopolysiloxane (A) as a main component for forming a cured coating; a silane or siloxane (C) as a crosslinking agent; component (F) as a catalyst for promoting condensation reaction between components (A) and (C); an inert diorganopolysiloxane (B) having a degree of polymerization equal to or higher than that of component (A) as a lubricant; a microparticulate powder (G) for flattening the cured product and imparting abrasion resistance; and organosilanes (D) and (E) as an adhesion enhancer for improving the binding of microparticulates to the matrix resin and enhancing the adhesion of the matrix resin to a rubber substrate. Since these components act in a synergistic manner, the composition, when applied and cured to a rubber substrate surface, forms a cured coating which is tack-free, water repellent, lubricating and abrasion resistant and maintains abrasion resistance over a long term.

A rubber article having a coating of the organopolysiloxane composition formed on a surface is also contemplated herein.

DETAILED DESCRIPTION OF THE INVENTION

As mentioned above, the organopolysiloxane composition of the invention contains components (A) to (G) as essential components.

Component (A) is a diorganopolysiloxane of the following general formula (1) which is a main component to form a coating by curing through reaction of its hydroxyl group at each terminal end with a hydrolyzable functional group of component (C) and alkoxy groups of components (D) and (E).

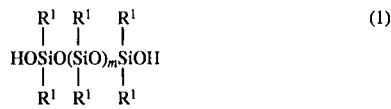

In formula (1), $R^1$ is a substituted or unsubstituted monovalent hydrocarbon group. It is preferably selected from hydrocarbon groups having 1 to 8 carbon atoms, more preferably 1 to 6 carbon atoms free from aliphatic unsaturated bond, for example, alkyl groups such as methyl, ethyl, propyl, isopropyl, butyl, isobutyl, tertbutyl, pentyl, neopentyl, hexyl and cyclohexyl, alkenyl groups such as vinyl, allyl, propenyl, isopropenyl, butenyl, isobutenyl and cyclohexenyl, aryl groups such as phenyl, tolyl, xylyl and naphthyl, aralkyl groups such as styrenyl, benzyl, phenylethyl and phenylpropyl and substituted hydrocarbon groups in which some hydrogen atoms of these hydrocarbon groups are replaced by halogen atoms including fluorine atoms and chlorine atoms, nitrile groups or the like such as chloromethyl, chloropropyl, bromoethyl, trifluoropropyl and cyanoethyl. Part (usually 1 mol% or less) of $R^1$ may be a hydroxyl group if particularly desired for imparting certain properties. A substituted or unsubstituted alkyl group, particularly a methyl group is preferred among these groups because of ease of synthesis, ease of handling, and an ability to impart adequate curability to the composition. Letter m which represents the degree of polymerization is an integer of at least 150, preferably from 150 to 10,000, more preferably from 200 to 10,000. If m is less than 150, the cured coating becomes brittle and would not follow deformation of the substrate. If m is too large, the composition before curing would have an increased viscosity to render handling less efficient. Two or more diorganopolysiloxanes may be used in combination if m is within the above-defined range and if desired.

Component (B) is an inert diorganopolysiloxane of the following general formula (2) which is free of a hydroxyl group attached to a silicon atom in a molecule and serves to impart lubricity and abrasion resistance to a cured coating.

(2)

In formula (2), $R^2$ is a substituted or unsubstituted monovalent hydrocarbon group having 1 to 8, preferably 1 to 6 carbon atoms free from aliphatic unsaturated bonds, examples of which are the same as described for $R^1$. Also, a substituted or unsubstituted alkyl group, particularly a methyl group, is a preferred $R^2$ group because of ease of synthesis. Letter n is an integer equal to or greater than m, and preferably in the range of 150 to 12,000, more preferably 200 to 10,000. Some of the above-mentioned advantages would be lost if n is smaller than m.

Component (B) is blended in amounts of 5 to 80 parts, preferably 5 to 60 parts by weight per 100 parts by weight of component (A). Less than 5 parts by weight of component (B) on this basis results in a cured coating which is less lubricating and less abrasion resistant whereas more than 80 parts by weight of component (B) results in a cured coating which is rather low in mechanical strength and less abrasion resistant.

Component (C) is either one or both of a silane and a siloxane, particularly an organosilane and/or an organosiloxane each having at least three hydrolyzable functional groups in a molecule. It serves as a cross-linking agent to form a coating of a three-dimensional network structure by reacting with a hydroxyl group attached to a silicon atom in component (A) in the presence of a condensation catalyst (F).

Examples of the hydrolyzable functional group include alkoxy groups such as methoxy, ethoxy, propoxy, isopropoxy, butoxy, isobutoxy, tert-butoxy, methoxymethoxy, methoxyethoxy, ethoxymethoxy and ethoxyethoxy; alkenyloxy groups such as vinyloxy, allyloxy, propenoxy, isopropenoxy, butenoxy and isobutenoxy; ketoxime residues, i.e. iminoxy groups, such as dimethyl ketoxime, diethyl ketoxime, methylethyl ketoxime, butanoxime, pentanoxime and iso-pentanoxime; acyloxy groups such as acetoxy, propionoxy, butyloyloxy and benzoyloxy; amino groups such as methylamino, ethylamino, propylamino, butylamino, hexylamino, dimethylamino, diethylamino, methylethylamino and cyclohexylamino; amide groups such as N-methylacetamide and N-ethylacetamide; aminoxy groups such as dimethylaminoxy and diethylaminoxy; isocyanate groups; and α-silylester groups. Beside the foregoing groups, chlorine and other halogen atoms can be used, but are undesirable because hydrogen halides resulting from hydrolysis are seriously corrosive and toxic.

Other than the above-mentioned hydrolyzable functional groups, a substituted or unsubstituted monovalent hydrocarbon group, preferably having 1 to 10 carbon atoms is attached to a silicon atom, examples of which are the same as described for $R^1$, and i s preferably an alkyl group having 1 to 8 carbon atoms, an alkenyl group having 2 to 10 carbon atoms or a phenyl group for ease of synthesis.

Examples of the silane having at least three hydrolyzable functional groups in a molecule include alkoxy silanes such as methyltrimethoxysilane, vinyltrimethoxysilane, phenyltrimethoxysilane, methyltriethoxysilane, tetramethoxysilane, tetraethoxysilane, tetrapropoxysilane, and 3-chloropropyltrimethoxysilane; alkenyloxysilanes such as methyltriisopropenoxysilane, vinyltriiso-propenoxysilane and phenyltriisopropenoxysilane; ketoximesilanes such as methyltris(methylethylketoxime)silane, vinyltris(methylethylketoxime)silane, phenyltris(methylethylketoxime)silane, methyltris(dimethylketoxime)silane, and tetrakis(methylethylketoxime)silane, acetoxysilanes such as methyltriacetoxysilane, vinyltriacetoxysilane, phenyltriacetoxysilane, and tetraacetoxysilane; aminosilanes such as methyltris(N-butyl-amino)silane, vinyltris(N-hexylamino)silane, phenyltris(N,N-diethylamino)silane; amidosilanes such as methyltris(N-methylacetamido)silane and vinyltris(N-ethylacetamido)silane; aminoxysilanes such as methyltris(N,N-diethylaminoxy)silane and vinyltris(N,N-diethylaminoxy)silane; and partial hydrolyzates thereof.

The organosiloxane having at least three hydrolyzable functional groups in a molecule is preferably a siloxane oligomer having 2 to 10, preferably 3 to 6 silicon atoms, and has as the substituents directly bonded to the silicon atoms the hydrolyzable functional groups and the unsubstituted or substituted monovalent hydrocarbon groups explained above. Preferably, the organosiloxane (siloxane oligomer) is one (so-called ester siloxane) in which the substituents directly bonded to the silicon atoms are all the hydrolyzable groups, particularly alkoxy groups.

Examples of the siloxane having at least three hydrolyzable functional groups in a molecule are shown below.

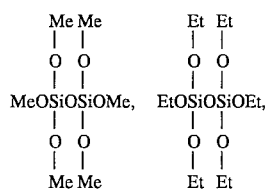

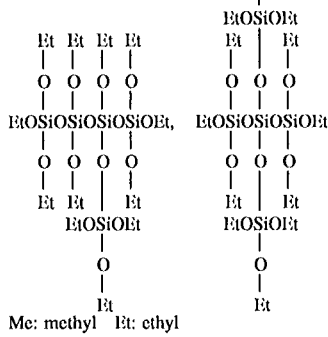

Me: methyl  Et: ethyl

Component (C) is blended in amounts of 0.2 to 30 parts, preferably 0.5 to 25 parts by weight per 100 parts by weight of component (A). Less than 0.2 parts by weight of component (C) on this basis results in insufficient curing of the composition whereas more than 30 parts by weight of component (C) results in a cured coating which is too hard and brittle to follow deformation of the underlying substrate.

Component (D) is an organosilane containing at least two alkoxy groups, preferably 2 to 3 alkoxy groups, each attached to a silicon atom and a mercapto group attached to a silicon atom through an alkylene group in a molecule, a partial hydrolyzate thereof, or a mixture of such an organosilane and a partial hydrolyzate thereof. It is effective for providing good adherence to the rubber substrate when used 30 in combination with component (E).

It should be noted that the partial hydrolyzate in component (D) and component (E) explained later means that the condensate obtained by partially hydrolyzing the silane so that at least two, preferably at least three of alkoxy groups are survived therein.

The alkoxy group preferably has 1 to 8 carbon atoms, more preferably 1 to 6 carbon atoms. Examples of the alkoxy group include methoxy, ethoxy, propoxy, isopropoxy, butoxy, isobutoxy, tert-butoxy, methoxyethoxy, and ethoxyethoxy groups, with the methoxy and ethoxy groups being preferred for ease of synthesis. The alkylene group preferably has 1 to 8 carbon atoms, more preferably 1 to 6 carbon atoms. Examples of the alkylene group include methylene, ethylene, propylene, tetra-methylene, hexamethylene, and methylethylene groups, with the propylene group being preferred for storage stability and ease of synthesis.

The organosilane may have an organic group attached to a silicon atom other than the alkoxy group and the mercapto-alkylene group. Examples of the organic group include a substituted or unsubstituted monovalent hydrocarbon group having 1 to 8 carbon atoms as exemplified by $R^1$, preferably an alkyl group such as a methyl group.

Examples of the organosilane (D) include γ-mercaptopropyltrimethoxysilane, γ-mercaptopropylmethyldimethoxysilane, and γ-mercaptopropyltriethoxysilane, and partial hydrolyzates thereof. Preferred among these is γ-mercaptopropyltrimethoxysilane, a partial hydrolyzate thereof or a mixture thereof.

Component (D) is blended in amounts of 1 to 20 parts, preferably 2 to 15 parts by weight per 100 parts by weight of component (A). Adhesion is poor with less than 1 part by weight of component (D) whereas more than 20 parts by weight of component (D) provides no further advantage and adversely affects the mechanical properties of a cured coating.

Component (E) is an organosilane containing at least two alkoxy groups, preferably 2 to 3 alkoxy groups, each attached to a silicon atom and a substituted or unsubstituted amino group attached to a silicon atom through an alkylene group in a molecule, a partial hydrolyzate thereof, or a mixture of such an organosilane and a partial hydrolyzate thereof. It is effective not only for providing good adherence to the rubber substrate when used in combination with component (D), but also for imparting lubricity to the cured coating.

Examples of the alkoxy group include the same alkoxy groups described in component (D) such as methoxy, ethoxy, propoxy and butoxy groups, with the methoxy and ethoxy groups being preferred for ease of synthesis. Examples of the alkylene group include the same alkylene group as described in component (D), preferably a propylene group. Examples of the substituted or unsubstituted amino group include amino group, an alkyl-substituted amino group such as methylamino and ethylamino groups, an amino-substituted amino group such as β-aminoethyl-amino group, and an aralkyl-substituted amino group such as benzylamino group. Examples of the substituted or unsubstituted amino group attached to a silicon atom through an alkylene group include aminomethyl, β-aminoethyl, γ-aminopropyl, δ-aminobutyl, γ-(methylamino)propyl, γ-(ethylamino)propyl, γ-(β-amino-ethylamino)propyl, and γ-(benzylamino)propyl groups. The alkylene group is preferably a propylene group as in the γ-aminopropyl group when stability during storage is taken into account.

The organosilane may have an organic group attached to a silicon atom other than the alkoxy group and the substituted or unsubstituted aminoalkylene group. Examples of the organic group include a substituted or unsubstituted monovalent hydrocarbon group having 1 to 8 carbon atoms as exemplified by $R^1$, preferably an alkyl group such as a methyl group.

Exemplary organosilanes as component (E) are γ-aminopropyltrimethoxysilane, γ-aminopropyltriethoxysilane, N-β-(aminoethyl)-β-aminopropyltrimethoxysilane, N-benzyl-γ-aminopropyltrimethoxysilane and partially hydrolyzed products thereof. Among these, γ-aminopropyltriethoxysilane and a partial hydrolyzate thereof are preferred.

Component (E) is blended in amounts of 5 to 150 parts, preferably 10 to 100 parts by weight per 100 parts by weight of component (A). Less than 5 parts by weight of component (E) results in poor adhesion and lubricity whereas more than 150 parts by weight of component (E) interferes with curing and adversely affects the mechanical properties of a cured coating.

Component (F) is a condensation catalyst for promoting curing of the composition. It may be selected from conventional condensation catalysts commonly used in prior art condensation type RTV silicone compositions, for example, metal (Sn, Zn, Fe, etc.) salts of fatty acids such as dibutyltin diacetate, dibutyltin dioctoate, dibutyltin dilaurate, dibutyltin dioleate, dibutyltin distearate, dibutyltin benzylmaleate, tributyltin acetate, tributyltin octoate, tributyltin laurate, dioctyltin diacetate, dioctyltin dilaurate, diethyltin dioleate, monomethyltin dioleate, zinc octanoate, iron octanoate, tin octanoate, and iron stearate; titanates such as tetraisopropyl titanate and tetrabutyl titanate; and titanium chelates such as dimethoxytitanium diacetylacetonate. These condensation catalysts may be used alone or in admixture of two or more.

Component (F) is blended in amounts of 0.1 to 30 parts, preferably 0.2 to 25 parts by weight per 100 parts by weight of components (A), (B) and (C) combined. Less than 0.1 part by weight of component (F) on this basis fails to provide sufficient catalysis to accomplish curing whereas more than 30 parts by weight of component (F) accelerates reaction too fast so that no appropriate pot life is available and can adversely affect the heat resistance of a cured coating.

Component (G) is a microparticulate powder having a mean particle size of up to 50 µm. It is effective for improving the abrasion resistance of a cured coating, eliminating gloss from the cured coating, and reducing a tacky feel on the coating surface. The powder is generally made of synthetic resins such as polycarbonate, nylon, polyethylene, Teflon® (polytetrafluoro-ethylene), polyacetal, polymethylsilsesquioxane and inorganic materials such as silica, zirconia and alumina, alone or in admixture of two or more. Preferred among these is the polycarbonate resin.

The microparticulate powder should have a mean particle size of up to 50 µm, usually 0.1 to 50 µm, preferably 0.3 to 30 µm. A mean particle size of more than 50 µm adversely affects the mechanical strength and abrasion resistance of a cured coating. Powder particles with a mean particle size of less than 0.1 µm would be difficult to produce and less effective for abrasion resistance improvement.

Preferably the powder particles are of spherical or flake shape although polygonal, irregular and fragmental shapes are acceptable. The particle color is not critical and may be determined for a particular application. For example, the particles may be colored black so as to obscure any discoloration of a coating when the underlying substrate is deformed.

Component (G) or fine powder is blended in an amount of 2 to 40 parts, preferably 5 to 30 parts by weight per 100 parts by weight of components (A), (B) and (C) combined. Less than 2 parts by weight of the powder is insufficient to render a coating abrasion resistant whereas more than 40 parts by weight of the powder adversely affects the mechanical strength and hence, abrasion resistance of a cured coating.

The microparticulate powder may be fed in powder form or dispersion or emulsion form in organic solvents or water.

It is understood that the microparticulate powder as component (G) is generally added to conventional curable resin compositions, for example, urethane resins and silicone resins for matting and improving abrasion resistance. When microparticulate powder is added to a coating composition, however, there sometimes arises a problem that when the particles themselves are non-bindable with the matrix resin, the particles can sometimes be separated from the matrix resin upon receipt of repetitive frictional forces. The present invention solves this problem by using components (D) and (E) in combination to significantly improve the binding of particles to the matrix resin for thereby providing a cured coating with long-lasting abrasion resistance.

Insofar as the objects of the invention are not impaired, various additives and fillers may be blended in the composition of the invention. Exemplary fillers are reinforcing fillers such as fumed silica and precipitated silica, which may have been treated to be hydrophobic, and non-reinforcing fillers such as silica aerogel, ground quartz, and diatomaceous earth. Various silicone resins and organic resins are also useful as reinforcing fillers. The fillers may be used alone or in admixture of two or more. The silicone resins used herein include silicone resins comprising a $R_3SiO_{1/2}$ unit and a $SiO_2$ unit and/or $RSiO_{3/2}$ unit and optionally comprising $R_2SiO_{2/2}$ unit, and silicone resins comprising a $RSiO_{3/2}$ unit, and optionally comprising $R_3SiO_{1/2}$ unit and/or $R_2SiO_{2/2}$ unit, with resins having a $\equiv$SiOH or $\equiv$SiOR group in a molecule being preferred. R represents a substituted or unsubstituted monovalent hydrocarbon group preferably having 1 to 8 carbon groups as exemplified by $R^1$, particularly methyl, vinyl, phenyl and trifluoropropyl groups.

Also the composition of the invention may contain inorganic pigments such as carbon black and iron oxide and UV absorbers such as carbon black and benzotriazoles.

In addition to components (D) and (E) mentioned above, there can be added a silane coupling agent for improving adhesion to a substrate. Exemplary silane coupling agents include γ-glycidoxypropyltrimethoxysilane, γ-methacryloxypropyltrimethoxysilane, β-(3,4-epoxycyclohexyl)ethyltrimethoxysilane, and γ-acryloxytrimethoxysilane and partial hydrolyzates thereof.

The composition of the invention can be prepared simply by mixing the above-mentioned components uniformly. It is recommended to store the components in three separate packages, a mixture of components (A), (B) and (G), a mixture of components (C), (D) and (E), and component (F) and combine them together on use.

When the composition of the invention is used as a surface treating agent for various rubber substrates, the composition may be used as such or after diluting with an organic solvent. Useful organic solvents include n-hexane, n-heptane, cyclohexane, industrial gasoline, petroleum naphtha, isoparaffin, benzene, toluene, xylene, isopropyl alcohol, butyl alcohol, cyclohexanone and methyl ethyl ketone, alone or in admixture of two or more. Preferred among these are industrial gasoline, petroleum naphtha, isoparaffin, or a mixture of one or more of them with isopropyl alcohol. The amount of the organic solvent used may be suitably determined in accordance with the viscosity desired for the composition on application.

A rubber substrate can be surface treated with the composition of the invention by any desired one of conventional application techniques for example, dipping, spraying, brush coating, knife coating, and roll coating. The coating, after drying to evaporate off the solvent where the solvent is used, is then cured by allowing to stand at room temperature or heating to an appropriate temperature. A cured coating is formed on the substrate surface in this way.

The surface of the substrate on which a cured coating of the inventive composition has been formed is non-tacky to a material which comes in contact therewith, water repellent and lubricating. The cured coating has improved abrasion resistance and maintains it over a long time as compared with cured coatings of conventional organopolysiloxane compositions. Therefore, the composition of the invention finds best use in applications where frictional forces are repeatedly applied, for example, as a surface treating agent for rubber parts such as automotive weather strips and vibration damping rubber.

EXAMPLE

Examples of the present invention are given below by way of illustration and not by way of limitation. All parts are by weight.

Example 1

To 1,000 parts of industrial gasoline No. 2 were added 100 parts of a both end hydroxyl-blocked dimethylpolysiloxane of the following average formula (1-1) and 15 parts of a dimethylpolysiloxane of the following average formula (2-1). 20 parts of spherical particles of polycarbonate resin having a mean particle size of 20 μm was added to the solution, which was agitated and mixed to form a powder dispersion. Then 10 parts of ethylpolysilicate (SiO$_2$ value 40%), 5 parts of γ-mercapto-propyltrimethoxysilane, and 35 parts of γ-aminopropyltriethoxysilane were added to the dispersion, which was agitated and mixed. Finally 15 parts of a 50 wt % toluene solution of dibutyltin dilaurate was added to the dispersion, which was fully mixed to form a surface treating composition in industrial gasoline solution form.

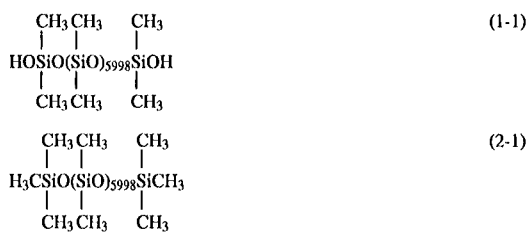

Example 2

A surface treating composition industrial gasoline solution form was prepared by the same procedure as Example 1 except that 100 parts of the both end hydroxyl-blocked dimethylpoly-siloxane of formula (1-1) was replaced by a mixture of 70 parts of the both end hydroxyl-blocked dimethylpolysiloxane of formula (1-1) and 30 parts of a both end hydroxyl-blocked dimethylpolysiloxane of the following average formula (1-2).

Comparative Example 1

A surface treating composition in industrial gasoline solution form was prepared by the same procedure as Example 1 except that the polycarbonate resin powder was omitted.

Comparative Example 2

A surface treating composition in industrial gasoline solution form was prepared by the same procedure as Comparative Example 1 except that 15 parts of the dimethylpolysiloxane of formula (2-1) was replaced by 15 parts of a dimethylpolysiloxane of the following average formula (2-2).

Comparative Example 3

A surface treating composition in industrial gasoline solution form was prepared by the same procedure as Example 2 except that the polycarbonate resin powder was omitted.

Comparative Example 4

A surface treating composition in industrial gasoline solution form was prepared by the same procedure as Comparative Example 3 except that 15 parts of the dimethylpolysiloxane of formula (2-1) was replaced by 15 parts of a dimethylpolysiloxane of formula (2-2) as used in Comparative Example 2.

Each of the surface treating liquids was spray coated onto a surface of EPDM sponge. The coating was dried in air for 5 minutes and heated at 100° C. for 10 minutes to form a cured film of 5 μm thick. The cured films resulting from the surface treating compositions within the scope of the invention (Examples 1 and 2) were tough, non-tacky, and lubricating.

The cured films were examined by an abrasion test under the following conditions.

| Sliding abrasion test | |
|---|---|
| Tester | reciprocal abrasion tester |
| Frictional element | glass plate of 5 mm thick |
| Load | 200 grams |
| Stroke | 100 mm |
| Frictional cycle | 30 cycles/min. |

Repetitive friction was applied to the coated EPDM by reciprocally moving the frictional element of glass over the coated EPDM under a load of 200 grams. During the test, the abrasion debris was sampled at intervals of 5,000 cycles. The reciprocal cycles were continued until debris of the underlying rubber was detected in the abrasion debris.

The test results are shown in Table 1. For example, a test result of 55,000 cycles OK means that abrasion of the underlying rubber occurred between 55,000 and 60,000 cycles; and a test result of 30,000 cycles NG means that abrasion of the underlying rubber occurred between 25,000 and 30,000 cycles.

TABLE 1

| | Abrasion test cycles |
|---|---|
| Example 1 | 55,000 cycles OK |
| Comparative Example 1 | 30,000 cycles NG |
| Comparative Example 2 | 20,000 cycles NG |
| Example 2 | 60,000 cylces OK |
| Comparative Example 3 | 35,000 cycles NG |
| Comparative Example 4 | 20,000 cycles NG |

There has been described an organopolysiloxane composition which is useful as a surface treating agent for cured moldings of various rubbers for imparting non-tackiness, water repellency and lubricity to the rubber surface and forming a coating which is durably abrasion resistant.

Japanese Patent Application No. 5-340045 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane composition comprising
   (A) 100 parts by weight of a diorganopolysiloxane of the following formula (1):

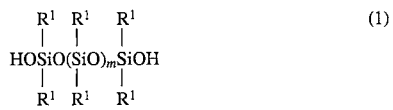

wherein $R^1$ is a substituted or unsubstituted monovalent hydrocarbon group and m is a number of 150 to 10,000, (B) 5 to 80 parts by weight of a diorganopolysiloxane of the following formula (2):

wherein $R^2$ is a substituted or unsubstituted monovalent hydrocarbon group and n is a number equal to or larger than m, (C) 0.2 to 30 parts by weight of at least one of a silane and/or a siloxane each having at least three hydrolyzable functional groups in a molecule, (D) 1 to 20 parts by weight of an organosilane having at least two alkoxy groups each attached to a silicon atom and one mercapto group separated from a silicon atom by an alkylene group in a molecule and/or a partial hydrolyzate thereof, (E) 5 to 150 parts by weight of an organosilane having at least two alkoxy groups each attached to a silicon atom and one substituted or unsubstituted amino group separated from a silicon atom by an alkylene group in a molecule and/or a partial hydrolyzate thereof, (F) a condensation catalyst in an amount of 0.1 to 30 parts by weight per 100 parts by weight of components (A) to (C) combined, and (G) a microparticulate powder having a mean particle size of up to 50 μm in an amount of 2 to 40 parts by weight per 100 parts by weight of components (A) to (C) combined.

2. The composition of claim 1 wherein component (G) is a polycarbonate resin powder.

3. A rubber article having on a surface a coating of the organopolysiloxane composition of claim 1.

4. The composition of claim 1, wherein:

in component (A), $R^1$ is a halogen-substituted, nitrile-substituted or unsubstituted monovalent hydrocarbon group of 1 to 8 carbon atoms, and in component (B), $R^2$ is a halogen-substituted, nitrile-substituted or unsubstituted monovalent hydrocarbon group of 1 to 8 carbon atoms.

5. The composition of claim 4, wherein $R^1$ and $R^2$ are free from aliphatic unsaturated bonds.

6. The composition of claim 1, wherein 1 mol % or less of the $R^1$ groups are replaced by a hydroxy group.

7. The composition of claim 1, wherein: in formula (2), n is from 150 to 12,000.

8. The composition of claim 1, wherein: in formula (1), m is from 200 to 10,000, and in formula (2), n is from 200 to 12,000.

9. The composition of claim 1, wherein component (B) is in an amount of 5 to 60 parts by weight.

10. The composition of claim 1, wherein component (C) comprises an organosilane or organosiloxane having at least three hydrolyzable functional groups in a molecule, wherein the hydrolyzable groups are alkoxy groups, alkenyloxy groups, ketoxime residues, acyloxy groups, amino groups, amido groups, aminoxy groups or α-silylester groups, and having a halogen-substituted, nitrile-substituted or unsubstituted monovalent hydrocarbon group of 1 to 10 carbon atoms attached to a silicon atom.

11. The composition of claim 1, wherein component (C) is an organosiloxane oligomer having 2 to 10 silicon atoms wherein each of the substituents bonded to a silicon atom is a hydrolyzable alkoxy group.

12. The composition of claim 1, wherein the amount of component (C) is 0.5 to 25 parts by weight.

13. The composition of claim 1, wherein component (D) is an organosilane having 2 or 3 alkoxy groups of 1–8 carbon atoms attached to a silicon atom and a mercapto group attached to a silicon atom through an alkylene chain of 1 to 8 carbon atoms.

14. The composition of claim 1, wherein the amount of component (D) is 2 to 15 parts by weight.

15. The composition of claim 1, wherein component (E) is an organosilane having 2 or 3 alkoxy groups of 1–8 carbon atoms attached to a silicon atom and an amino group attached to a silicon atom through an alkylene chain of 1 to 8 carbon atoms, wherein the amino group is an unsubstituted amino, alkylamino, aminoalkylamino or aralkylamino group.

16. The composition of claim 15, wherein the amino group attached to a silicon atom through an alkylene chain is a γ-aminopropyl group.

17. The composition of claim 1, wherein the amount of component (E) is 10 to 100 parts by weight.

18. The composition of claim 1, wherein the microparticulate powder, (G), is a powder of a polycarbonate, nylon, polyethylene, polytetrafluoroethylene, polyacetal or polymethylsilsesquioxane synthetic resin or a silica, zirconia or alumina inorganic material or a mixture of two or more thereof.

* * * * *